(12) United States Patent
Marks et al.

(10) Patent No.: US 10,245,507 B2
(45) Date of Patent: Apr. 2, 2019

(54) SPECTATOR MANAGEMENT AT VIEW LOCATIONS IN VIRTUAL REALITY ENVIRONMENTS

(71) Applicant: Sony Interactive Entertainment Inc., Tokyo (JP)

(72) Inventors: Richard L. Marks, Pleasanton, CA (US); Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 126 days.

(21) Appl. No.: 15/283,069

(22) Filed: Sep. 30, 2016

(65) Prior Publication Data

US 2017/0354875 A1 Dec. 14, 2017

Related U.S. Application Data

(60) Provisional application No. 62/349,587, filed on Jun. 13, 2016.

(51) Int. Cl.
*A63F 13/25* (2014.01)
*A63F 13/213* (2014.01)
(Continued)

(52) U.S. Cl.
CPC ............ *A63F 13/25* (2014.09); *A63F 13/211* (2014.09); *A63F 13/212* (2014.09);
(Continued)

(58) Field of Classification Search
CPC .......... A63F 13/25; A63F 13/33; A63F 13/52; A63F 2300/8082
(Continued)

(56) References Cited

U.S. PATENT DOCUMENTS 7,803,048 B2 * 9/2010 Tilston .................... A63F 13/10
463/2
8,556,715 B2 * 10/2013 Archer .................... A63F 13/79
463/31

(Continued)

OTHER PUBLICATIONS

Invitation to Pay Additional Fees issued in corresponding International Application No. PCT/US2017/033392, dated Aug. 25, 2017 (9 total pages).

(Continued)

*Primary Examiner* — Michael Cuff
(74) *Attorney, Agent, or Firm* — Penilla IP, APC

(57) ABSTRACT

A method is provided, including the following method operations: providing a first view of a virtual environment to a first head-mounted display (HMD), the first view being defined from a first location in the virtual environment, and associated to a first virtual character having a first view direction towards a virtual object in the virtual environment; simultaneous with the providing the first view, providing a second view of the virtual environment to a second HMD, the second view being defined from the first location in the virtual environment, and associated to a second virtual character in the virtual environment; wherein providing the second view includes rendering the first virtual character in the second view, the rendering of the first virtual character in the second view being configured to present the first virtual character as having a second location in the virtual environment, the rendering of the first virtual character in the second view being further configured to present the first virtual character as having a second view direction that is adjusted relative to the first view direction so as to be towards the virtual object as shown in the second view.

19 Claims, 16 Drawing Sheets

(51) Int. Cl.
    *A63F 13/33*    (2014.01)
    *A63F 13/52*    (2014.01)
    *G06F 3/01*     (2006.01)
    *G06T 15/20*    (2011.01)
    *A63F 13/26*    (2014.01)
    *A63F 13/211*   (2014.01)
    *A63F 13/5255*  (2014.01)
    *A63F 13/86*    (2014.01)
    *A63F 13/212*   (2014.01)

(52) U.S. Cl.
    CPC ............ *A63F 13/213* (2014.09); *A63F 13/26* (2014.09); *A63F 13/33* (2014.09); *A63F 13/52* (2014.09); *A63F 13/5255* (2014.09); *A63F 13/86* (2014.09); *G06F 3/012* (2013.01); *G06T 15/205* (2013.01); *A63F 2300/8082* (2013.01); *G06F 3/013* (2013.01)

(58) Field of Classification Search
    USPC .......................................................... 463/31
    See application file for complete search history.

(56) References Cited

U.S. PATENT DOCUMENTS

| | | | |
|---|---|---|---|
| 8,814,691 B2* | 8/2014 | Haddick | G02B 27/017 463/30 |
| 9,077,647 B2* | 7/2015 | Fein | G06F 3/048 |
| 9,132,342 B2* | 9/2015 | Balachandreswaran | A63F 13/00 |
| 9,332,285 B1* | 5/2016 | Grant | H04N 21/23439 |
| 9,908,048 B2* | 3/2018 | Osman | A63F 13/537 |
| 2011/0018982 A1* | 1/2011 | Shibamiya | H04N 13/0014 348/54 |
| 2011/0242134 A1* | 10/2011 | Miller | G06T 19/006 345/633 |
| 2012/0249416 A1 | 10/2012 | Maciocci et al. | |
| 2012/0264510 A1* | 10/2012 | Wigdor | A63F 13/40 463/31 |
| 2013/0342564 A1 | 12/2013 | Kinnebrew et al. | |
| 2014/0002351 A1* | 1/2014 | Nakayama | G06F 3/012 345/156 |
| 2014/0125698 A1 | 5/2014 | Latta et al. | |
| 2014/0364212 A1* | 12/2014 | Osman | A63F 13/213 463/31 |
| 2015/0350628 A1* | 12/2015 | Sanders | G06T 15/08 345/419 |
| 2016/0171846 A1* | 6/2016 | Brav | G08B 6/00 340/407.1 |

OTHER PUBLICATIONS

Notification of Transmittal of the International Search Report and the Written Opinion of the International Searching Authority, or the Declaration, issued in corresponding International Application No. PCT/US2017/033392, dated Oct. 16, 2017 (16 total pages).

* cited by examiner

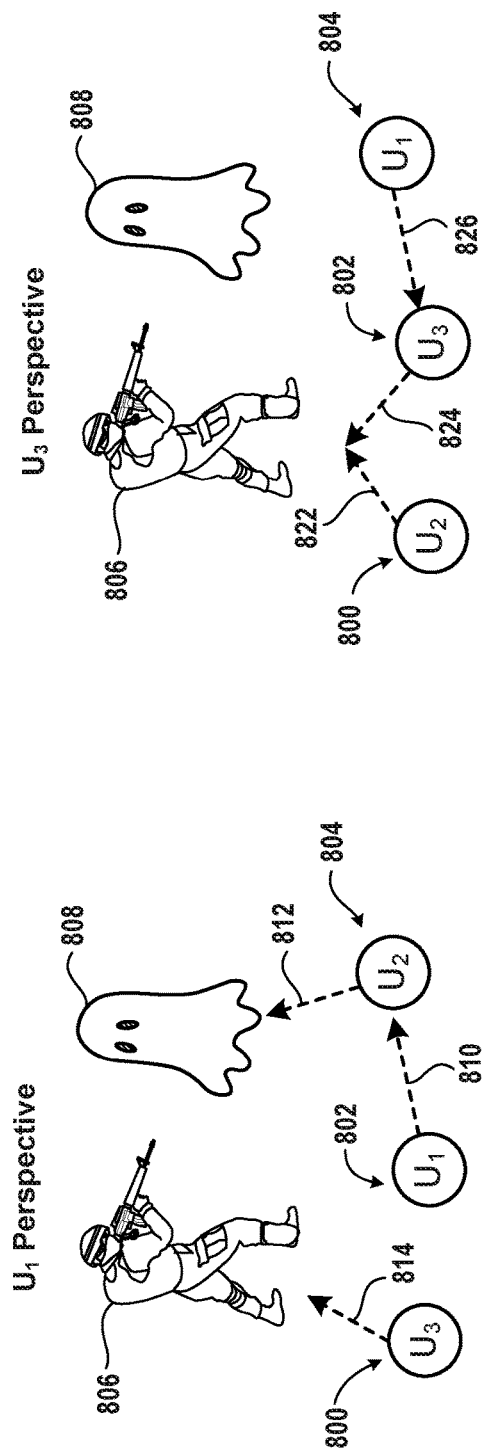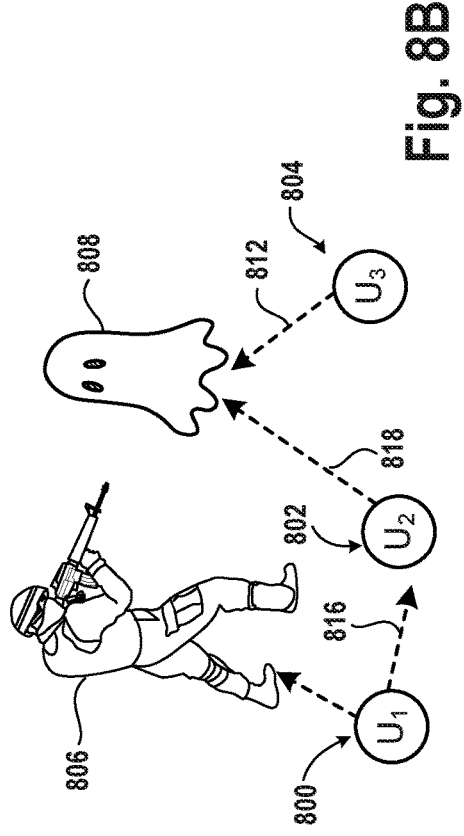

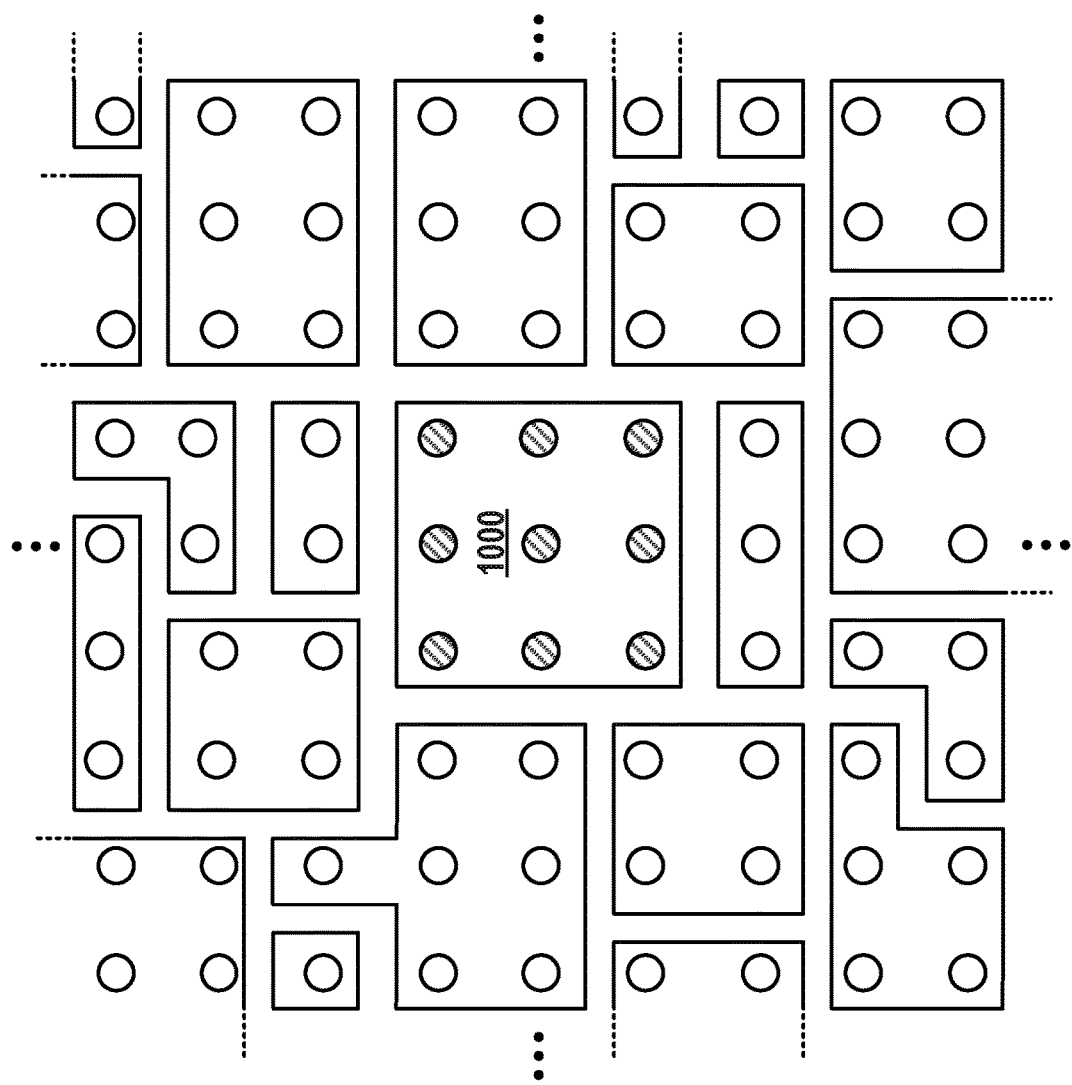

SPECTATOR MANAGEMENT AT VIEW LOCATIONS IN VIRTUAL REALITY ENVIRONMENTS

CLAIM OF PRIORITY

This application claims priority to U.S. Provisional Application No. 62/349,587, filed Jun. 13, 2016, entitled "Spectator Management at View Locations in Virtual Reality Environments," the disclosure of which is incorporated by reference.

RELATED APPLICATIONS

This application is related to U.S. Provisional Application No. 62/309,882, filed Mar. 7, 2016, entitled "Spectating Virtual (VR) Environments Associated With VR User Interactivity," the disclosure of which is incorporated by reference.

BACKGROUND

1. Field of the Disclosure

The present disclosure relates to virtual reality (VR) environment content presented in head mounted displays (HMDs), and methods and systems for managing HMD spectators that spectate from a common viewing location, while also enabling in a given spectator's view a rendering of other spectators.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

It is in this context that embodiments of the disclosure arise.

SUMMARY

Implementations of the present disclosure include methods and systems that are used for enabling multiple spectators to spectate a virtual reality environment, while providing each spectator with a preferred viewing location from which to spectate the virtual reality environment.

In some implementations, a method is provided, comprising: providing a first view of a virtual environment to a first head-mounted display (HMD), the first view being defined from a first location in the virtual environment, and associated to a first virtual character having a first view direction towards a virtual object in the virtual environment; simultaneous with the providing the first view, providing a second view of the virtual environment to a second HMD, the second view being defined from the first location in the virtual environment, and associated to a second virtual character in the virtual environment; wherein providing the second view includes rendering the first virtual character in the second view, the rendering of the first virtual character in the second view being configured to present the first virtual character as having a second location in the virtual environment, the rendering of the first virtual character in the second view being further configured to present the first virtual character as having a second view direction that is adjusted relative to the first view direction so as to be towards the virtual object as shown in the second view.

In some implementations, the second view direction is adjusted relative to the first view direction by turning a head and/or body of the first virtual character so as to face towards the virtual object.

In some implementations, providing the first view of the virtual environment to the first HMD includes processing data identifying an orientation of the first HMD in a first interactive environment in which the first HMD is disposed; wherein the first view direction is substantially determined by the orientation of the first HMD in the first interactive environment.

In some implementations, providing the second view of the virtual environment to the second HMD includes processing data identifying an orientation of the second HMD in a second interactive environment in which the second HMD is disposed.

In some implementations, the virtual object towards which the first view direction is directed is identified based on extrapolation of the first view direction from the first location in the virtual environment.

6. The method of claim 1, wherein the second view direction is determined based on relative positioning of the first location, the second location, and the virtual object in the virtual environment.

In some implementations, the virtual environment is defined for gameplay of a video game, and wherein the first view and second view are spectator views of the gameplay of the video game.

In some implementations, a method is provided, comprising: receiving, over a network, requests to spectate a virtual environment using a plurality of head-mounted displays (HMDs); assigning each HMD to one of a plurality of viewing groups, each viewing group defining a spatial arrangement for avatars associated with HMDs that are assigned to the viewing group; for each HMD, providing, over the network, a view of the virtual environment for rendering on the HMD, wherein providing the view includes placing the viewing group to which the HMD is assigned at a designated view location in the virtual environment, and providing the view from a perspective of the HMD's associated avatar as defined by the spatial arrangement of the viewing group; wherein the designated view location in the virtual environment is the same for each viewing group.

In some implementations, the spatial arrangement defined by a given viewing group includes a cluster of avatar placement locations having a fixed spatial relationship to each other in the virtual environment.

In some implementations, when providing the view for a given HMD, the viewing group to which the given HMD is assigned is placed in the designated view location to the exclusion of other viewing groups.

In some implementations, when providing the view for the given HMD, at least some of the other viewing groups are placed at other view locations in the virtual environment so as to be adjacent to and/or surrounding the viewing group to which the given HMD is assigned.

In some implementations, assigning the HMDs is based on social graphs of user accounts associated with the HMDs.

In some implementations, the requests to spectate the virtual environment are received over the network from a plurality of HMD connected computers.

In some implementations, a method is provided, comprising: receiving, over a network, requests to spectate a virtual environment using a plurality of head-mounted displays (HMDs); for each HMD, assigning an avatar associated with the HMD to a position in a spectator array, the spectator array defining an arrangement of the avatars relative to each other when rendered in the virtual environment; for each HMD, providing, over the network, a view of the virtual environment for rendering on the HMD, wherein providing the view includes positioning a portion of the spectator array that includes the HMD's associated avatar in the virtual environment, so that the HMD's associated avatar is positioned at a primary viewing location in the virtual environment; wherein the primary viewing location in the virtual environment is the same for each HMD.

In some implementations, positioning the portion of the spectator array that includes the HMD's associated avatar, so that the HMD's associated avatar is located at the primary viewing location, further includes, positioning other avatars, that are included in the portion of the spectator array, at secondary viewing locations surrounding the primary viewing location in the virtual environment, the positioning of the other avatars at the secondary viewing locations being configured to maintain the arrangement of the HMD's associated avatar and the other avatars relative to each other as defined by the spectator array.

In some implementations, the arrangement of the avatars relative to each other identifies a fixed spatial positioning of the avatars relative to each other.

In some implementations, when providing the view for a given HMD, the HMD's associated avatar is positioned at the primary viewing location to the exclusion of other avatars.

In some implementations, assigning the HMDs is based on social graphs of user accounts associated with the HMDs.

In some implementations, the requests to spectate the virtual environment are received over the network from a plurality of HMD connected computers.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 2A-1 and 2A-2 illustrate a head-mounted display (HMD), in accordance with an embodiment of the disclosure.

FIGS. 8A, 8B, and 8C illustrate a VR scene in a VR environment as viewed from the perspectives of three different spectators, in accordance with implementations of the disclosure.

FIG. 10B illustrates a viewing group 1000 in a VR environment surrounded by additional viewing groups of various sizes, in accordance with implementations of the disclosure.

DETAILED DESCRIPTION

The following implementations of the present disclosure provide methods, systems, computer readable media and cloud systems, for providing HMD spectators of a virtual environment (e.g. a gaming environment) with customized views that improve the experience of the spectators. More specifically, in accordance with implementations of the disclosure, spectators are able to view the virtual environment from the same, or substantially the same, viewing location, yet also be provided with rendering of other spectators, such as their friends, in their vicinity in the virtual environment. The viewing location can be a predefined viewing location that may be a preferred or optimal viewing location. Thus, each spectator is able to experience substantially the same vantage point in the virtual environment, while also being provided with the sensation that they are surrounded by other spectators, even as each of the other spectators is also provided with the same vantage point in the virtual environment and sensation of being surrounded by other spectators. A predefined viewing location within the virtual reality environment can draw the attention of spectators to view or focus on interesting content within the virtual environment, which for example may be a virtual reality scene of a video game, e.g. as navigated by an HMD player. It will be appreciated that there may be more than one viewing location which may be predefined at different areas of a game, content, multimedia, or generally content being navigated by the (e.g. HMD) player.

In various implementations, the methods, systems, image capture objects, sensors and associated interface objects (e.g., gloves, controllers, etc.) are configured to process data that is configured to be rendered in substantial real time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

It will be obvious, however, to one skilled in the art, that the present disclosure may be practiced without some or all of these specific details. In other instances, well known process operations have not been described in detail in order not to unnecessarily obscure the present disclosure.

Figure 1:
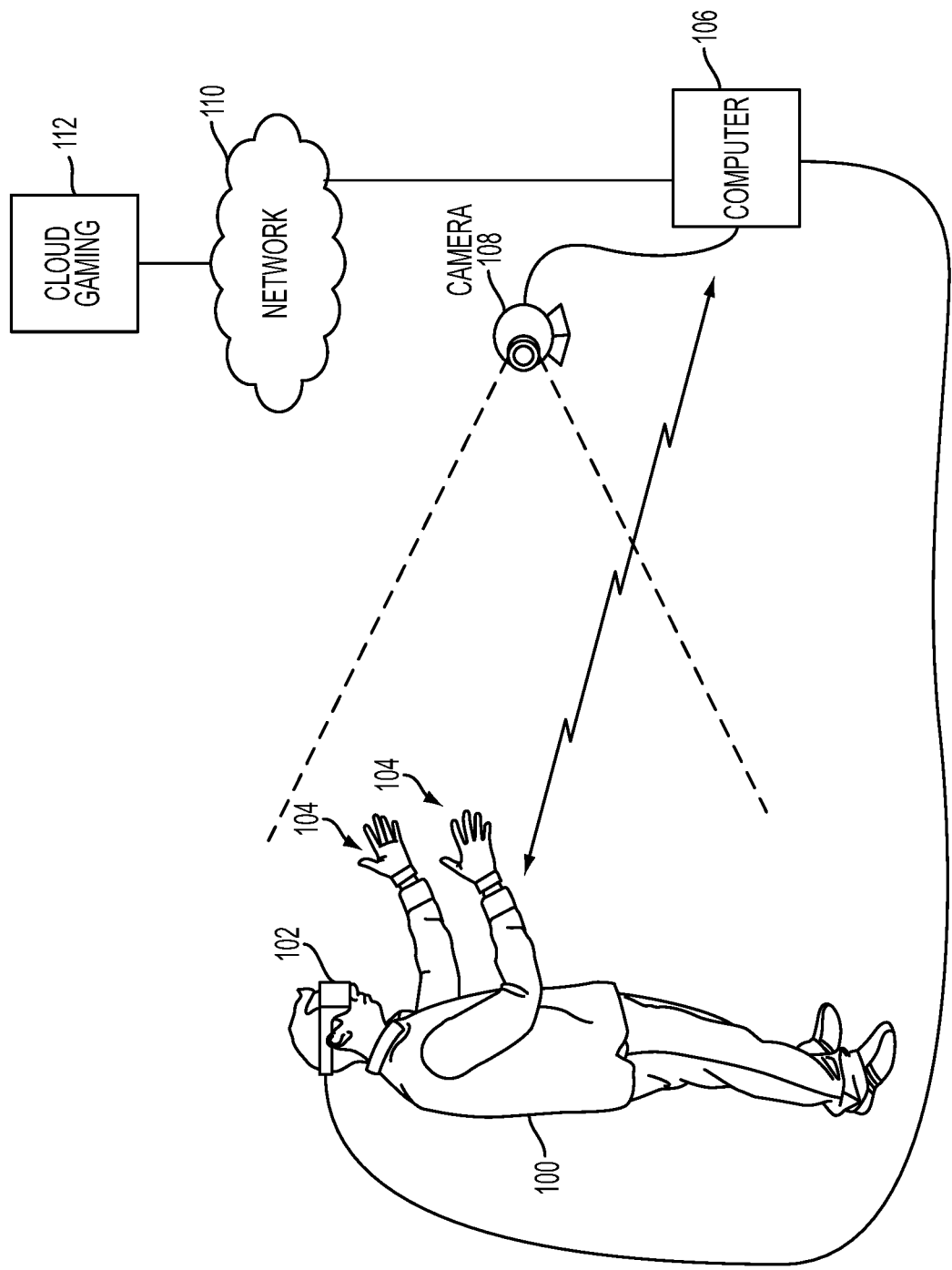
FIG. 1 illustrates a system for interactive gameplay of a video game, in accordance with an embodiment of the disclosure.

FIG. 1 illustrates a system for interactive gameplay of a video game, in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104a to provide input for the video game. Additionally, a camera 108 can be configured to capture images of the interactive environment in which the user 100 is located. These captured images can be analyzed to determine the location and movements of the user 100, the HMD 102, and the glove interface object 104a. In one embodiment, the glove interface object 104a includes a light which can be tracked to determine its location and orientation.

As described below, the way the user interfaces with the virtual reality scene displayed in the HMD 102 can vary, and other interface devices in addition to glove interface objects 104a, can be used. For instance, single-handed controllers can also be used, as well as two-handed controllers. In some embodiments, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104a and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104a.

In one embodiment, the HMD 102, glove interface object 104a, and camera 108, may themselves be networked devices that connect to the network 110 to communicate with the cloud gaming provider 112. For example, the computer 106 may be a local network device, such as a router, that does not otherwise perform video game processing, but which facilitates passage of network traffic. The connections to the network by the HMD 102, glove interface object 104a, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figures 1, 2A:
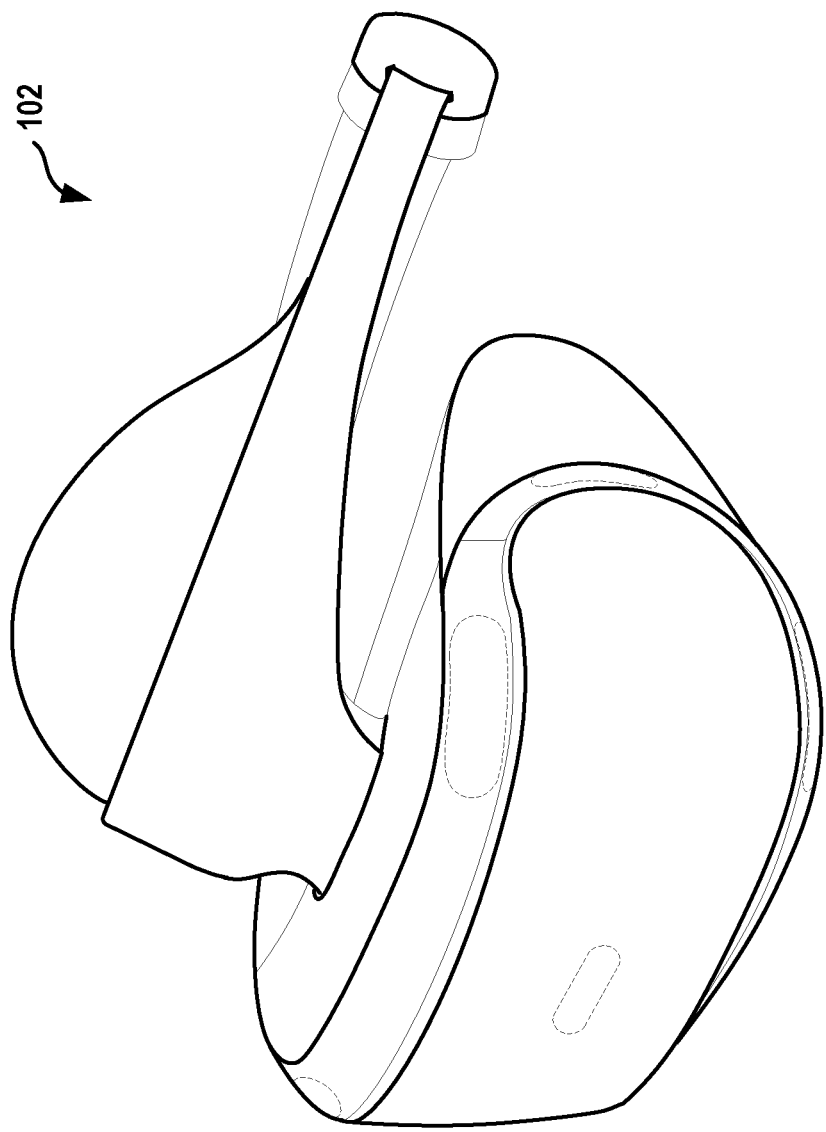
Figures 2, 2A:
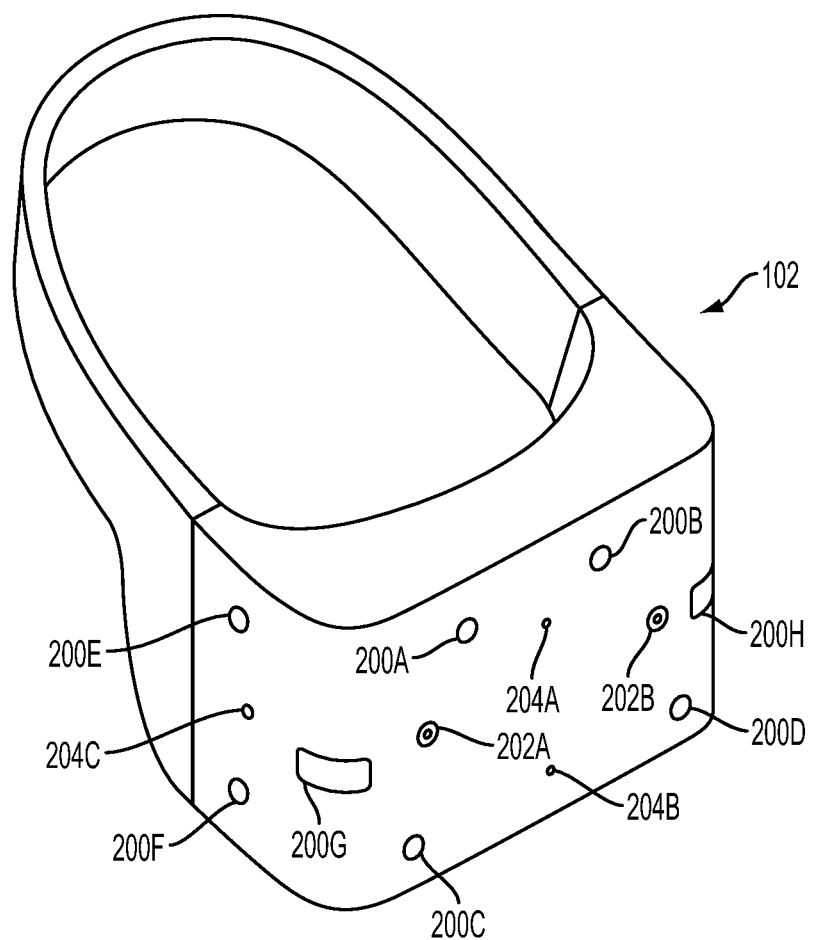

FIGS. 2A-1 and 2A-2 illustrate a head-mounted display (HMD), in accordance with an embodiment of the disclosure. FIG. 2A-1 in particular illustrates the Playstation® VR headset, which is one example of a HMD in accordance with implementations of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

Figure 3:
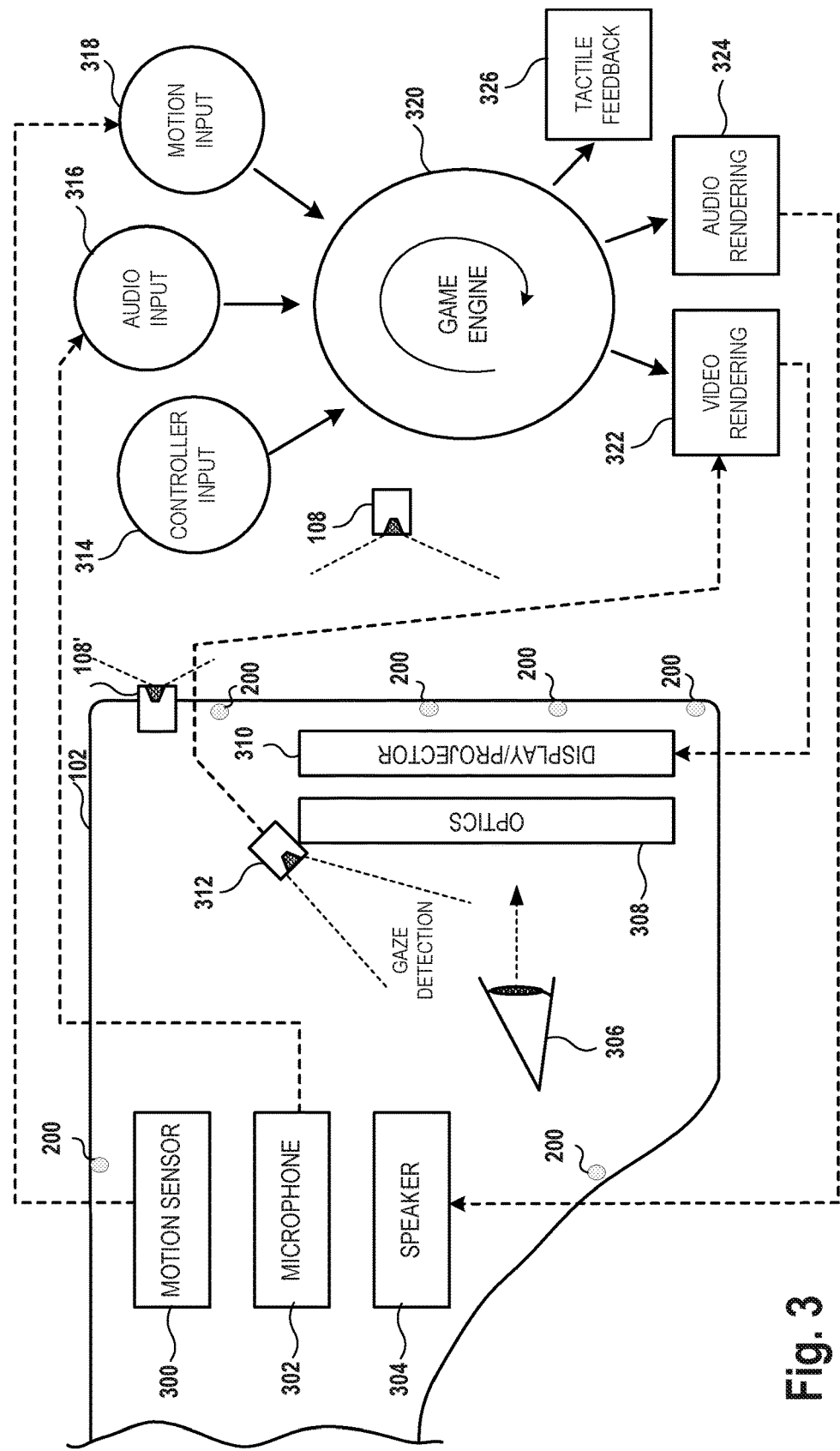
FIG. 3 conceptually illustrates the function of an HMD in conjunction with an executing video game, in accordance with an embodiment of the disclosure.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 2B:
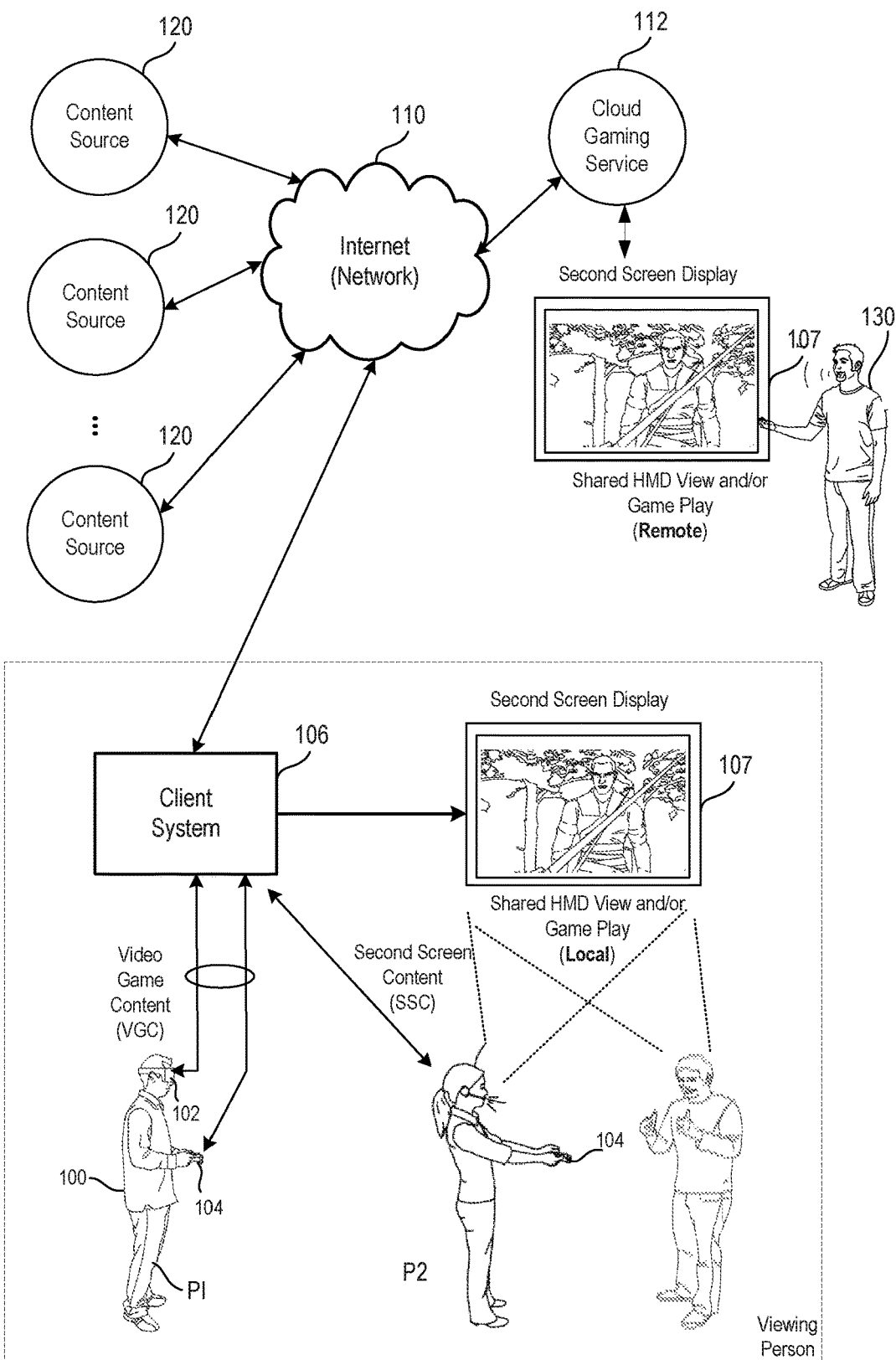
FIG. 2B illustrates one example of an HMD user interfacing with a client system, and the client system providing content to a second screen display, which is referred to as a second screen, in accordance with one embodiment.

FIG. 2B illustrates one example of an HMD 102 user 100 interfacing with a client system 106, and the client system 106 providing content to a second screen display, which is referred to as a second screen 107. The client system 106 may include integrated electronics for processing the sharing of content from the HMD 102 to the second screen 107. Other embodiments may include a separate device, module, connector, that will interface between the client system and each of the HMD 102 and the second screen 107. In this general example, user 100 is wearing HMD 102 and is playing a video game using controller 104. The interactive play by user 100 will produce video game content (VGC), which is displayed interactively to the HMD 102.

In one embodiment, the content being displayed in the HMD 102 is shared to the second screen 107. In one example, a person viewing the second screen 107 can view the content being played interactively in the HMD 102 by user 100. In another embodiment, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 107 along with the VGC received from the HMD 102.

Accordingly, the interactivity by other users who may be co-located or remote from an HMD user can be social, interactive, and more immersive to both the HMD user and users that may be viewing the content played by the HMD user on a second screen 107. As illustrated, the client system 106 can be connected to the Internet 110. The Internet can also provide access to the client system 106 to content from various content sources 120. The content sources 120 can include any type of content that is accessible over the Internet.

Such content, without limitation, can include video content, movie content, streaming content, social media content, news content, friend content, advertisement content, etc. In one embodiment, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one embodiment receive the second screen content from one of the content sources 120, or from a local user, or a remote user.

FIG. 3 conceptually illustrates the function of the HMD 102 in conjunction with an executing video game, in accordance with an embodiment of the disclosure. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony PlayStation® Move motion controller) or glove interface object 104a. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

At present, streaming services for sharing gameplay are very popular. The DualShock®4 wireless controller includes a "share button" directly on the controller to enable such sharing. As described above, there is a need to provide users the ability to spectate, e.g., watch the interactive activity being experienced by users (who may be wearing HMDs 102). For example, one HMD virtual reality player may be immersed in the activity presented in the HMD, while other persons/spectators (who may be co-located with the player, or remotely situated) may find enjoyment in watching the interactivity experienced or virtual reality scene being viewed by the HMD player. As used herein, an HMD player is one that is viewing content presented on the HMD, or can be one that is interacting with some content presented on the HMD, or can be playing a game presented on the HMD. The spectators may be wearing HMDs and so may experience an immersive effect of being in the same virtual environment as the player, thus heightening the spectator experience.

In still other embodiments, a website may be provided to present users with the ability to search for different types of content or media being played by remote players, and/or select from different players, so as to watch and spectate while the player performs his or her activities. The remote players may, in some embodiments, be playing games using an HMD 102. In other embodiments, the remote players may be playing games or watching content using a display screen of a device or a television display screen. Broadly speaking, users wishing to watch the activity of another player that is remote, e.g., over a website, can then select specific players or types of games, or thumbnails of the games, or thumbnails of the content, to view the activity being directed by the player. Thus, a website can be provided that enables users to view and select specific interactive content that may be actively played by a remote player. The spectator wishing to view the activity by the player, can simply click on that content and begin watching. It will be appreciated that the one or both of the player and spectator may be using an HMD to view the virtual environment.

The person watching and viewing the actions by the HMD player is generally referred to as a spectator. Spectators are those persons who are given access to view the activities, interactivities, actions, movements, etc., but are not necessarily controlling the game action. For this reason, these viewers are referred to as spectators. In the context of an HMD player, the content being presented in the HMD display is dynamic and is controlled by the movements of the HMD player. For example, when the HMD player moves his or her head around, that player is presented with different content that is viewable, similar to the way real world viewing of a person's surroundings can occur.

By way of example, some of the embodiments described herein teach ways of providing different viewing locations/spots within the virtual reality environment being viewed by the player. In some embodiments, as the HMD player moves and traverses through different virtual reality environments scenes, locations, areas, levels, chapters, etc., the spectating user can be provided with different viewing spots, which are customized to the viewing spectator. For instance, various viewing spots can be pre-authored for different types of content.

In further embodiments, spectators can be provided with visual clues to enable the spectator to identify where the player is looking within a virtual reality environment. One configuration can allow for tracking of the gaze of the player, to determine what exactly the player is looking at within the VR scene. For the spectator, who may be viewing the VR scene from a different perspective, it would be useful to determine what is the focus in the particular scene. In this manner, the spectator can also focus upon what the virtual reality player feels is important in the scene. In some examples, such as a first-person shooter game, the spectator may want to know where the player is looking, so as to identify enemies or obstacles. In one embodiment, by tracking the gaze of the player (e.g. using an HMD), it is possible to identify what the player is looking at, by highlighting content, changing the contrast of certain objects or locations, encircle content, add a marker, grey-out in area, add flashing beacons, add text, add floating objects, etc. In this manner, the spectator can then know for sure where the HMD player is looking, so the spectator himself can also view that same area and experience the content with more enjoyment.

For instance, the player may be more experienced in a particular game, or has watched a particular type of content, and providing this indicator of where the HMD player is looking in the virtual reality scene will provide guidance, visual cues, and help to the spectator. In some embodiments, these identifying features can be turned on and off, so as to remove distraction. The identifiers can be activated by the HMD player or can be activated by the spectator. In some embodiments, where multiple spectators are viewing the same content provided by the HMD player, e.g. in a Twitch presentation, each of the spectators can be provided with different controls that provide to them the ability to provide the visual indicators or not. From the perspective of the HMD player, the indicators may not be shown at all in the HMD of the HMD player. However, these indicators will be useful to the spectator or spectators that may be viewing the content being interacted with by the HMD player.

In some embodiments, spectators can be provided with controls that allow the spectator to identify specific listening zones within the virtual reality environment. The listening zones allow spectators to select where in the virtual reality environment they wish to listen from. What this means is that the spectator is essentially provided with listening audio and acoustics that mimic a situation where the spectator would actually be present in the scene from that specific location. By way of example, if a spectator is viewing HMD content that includes a building across the street, relative to the viewing location, the spectator can identify some location in the building, e.g. the second-story where a person is standing, and select to listen at that location.

This functionality provides a listening teleportation for the spectator, which allows the spectator to listen to the content of audio, and acoustics as if the spectator were sitting or standing in the second-story building. The audio and acoustics, in one example, would essentially magnify the audio sounds that would be present at the second-story location of the building, and reduce the sounds that are further away from that virtual location. In some embodiments, the spectator can from time to time, select different locations within the environment for being the primary listening zone. In still other embodiments, the listening zone can also be adjusted to be the same listening zone of the HMD player. A spectator can be provided with switchable selection capabilities, so as to identify where in the virtual environment the spectator wishes to listen.

Again, it is noted that the spectator can be local or remote to an HMD player, and can be viewing the HMD content on a second screen as described with reference to FIG. 2B. Alternatively, the spectator can also be wearing an HMD, which provides spectator viewing into the HMD player content. In some embodiments, the spectators can be watching live or substantially live content by the HMD player. In other embodiments, the spectators can be watching a recorded version of the content that was viewed by the HMD player. Still further, websites can be provided that allow for multiple or even many multiples of spectators to watch the same content of the HMD player, whether live or recorded.

Figure 4:
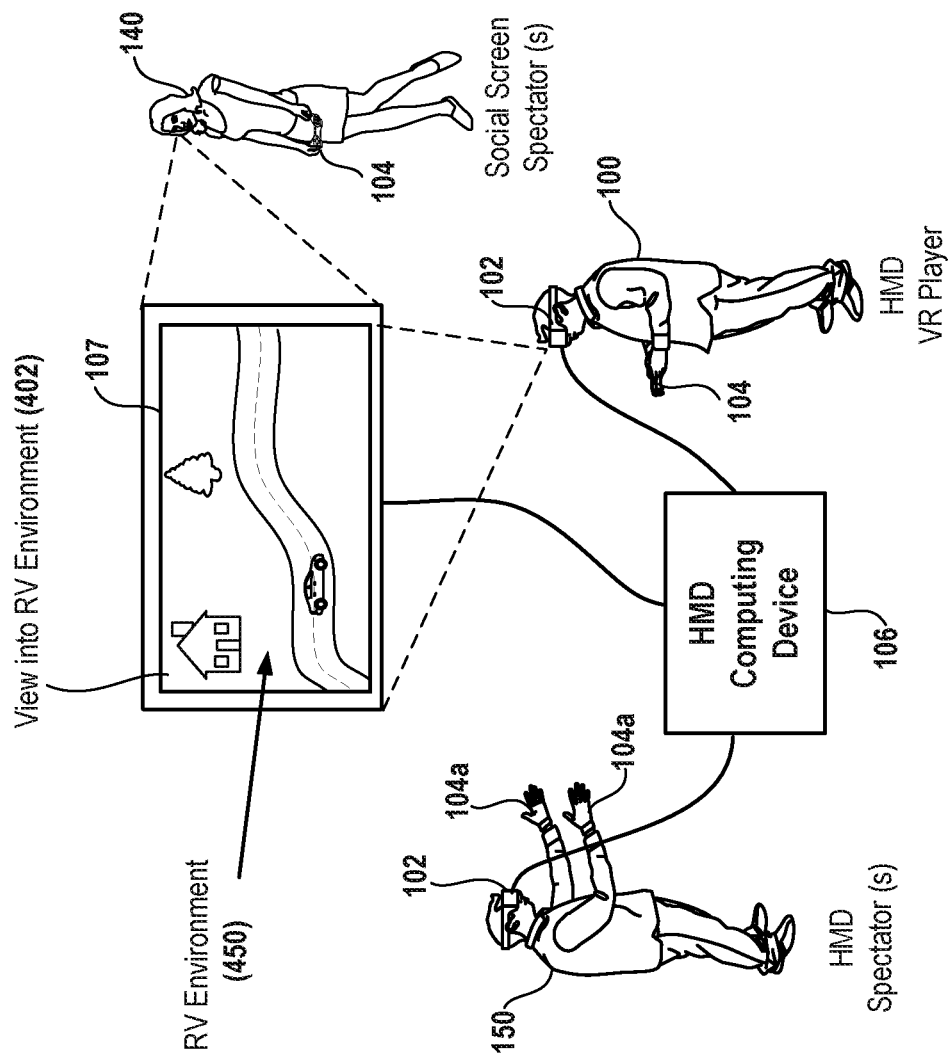
FIG. 4 illustrates an example of an HMD player navigating a virtual reality environment, and one or more spectators viewing the virtual-reality content.

FIG. 4 illustrates an example of an HMD VR player 100, who may be interacting with a virtual environment 450 via computing device 106, in accordance with one embodiment. The HMD VR player 100 is therefore driving the interactivity within the VR environment 450, which will move the scenes presented in the HMD 102, as well as the replicated view shown in the display 107. The spectator can therefore be one that is viewing the display 107, such as spectator 140. As mentioned above, the spectator 140 is a social screen spectator, as that spectator is able to interact with the HMD player 100 in a co-located space. In other embodiments, or in addition to the co-located spectator 140, an HMD spectator 150 can also be provided access to the content being navigated by the HMD player 100. The HMD spectator 150 can be co-located with the HMD player 100. In other embodiments, the HMD spectator 150 can be remotely located from the HMD player and can view the content from a website, such as a Twitch-type viewing website. Therefore, the example shown in FIG. 4 is only one example, and it is possible to have multiple spectators or even thousands of spectators viewing the HMD players content from remote locations. The spectators, whether they be viewing a display 107 or viewing the content via an HMD, will be provided with functionality for improving the spectating experience.

When multiple spectators are spectating an event in a virtual reality (VR) environment/space, it is possible to provide each spectator with the same optimal viewing location, or the "best seat in the house." That is, because the environment is a virtual space, there is no physical limit on how many users may occupy the same location in the virtual space. However, part of the experience of spectating an event in the real world is the sense of being part of a crowd, and being able to interact with those members of the crowd that are proximately located to oneself. If all spectators of a VR environment are situated at the same spot in order to give each spectator the best possible viewing experience, then there is no longer the sense of being part of a crowd. And rendering of multiple spectator avatars in the same location can make for a poor user experience.

One possible solution is to provide artificial intelligence (AI) avatars in the virtual environment surrounding a given spectator avatar. However, AI avatars will not truly replicate the experience provided by avatars that are driven by human operators. Furthermore, users may desire to spectate an event with their friends and interact with them while spectating, as is common in the real world, and inserting AI-controlled avatars as described would not provide for this type of shared experience.

Figure 5:
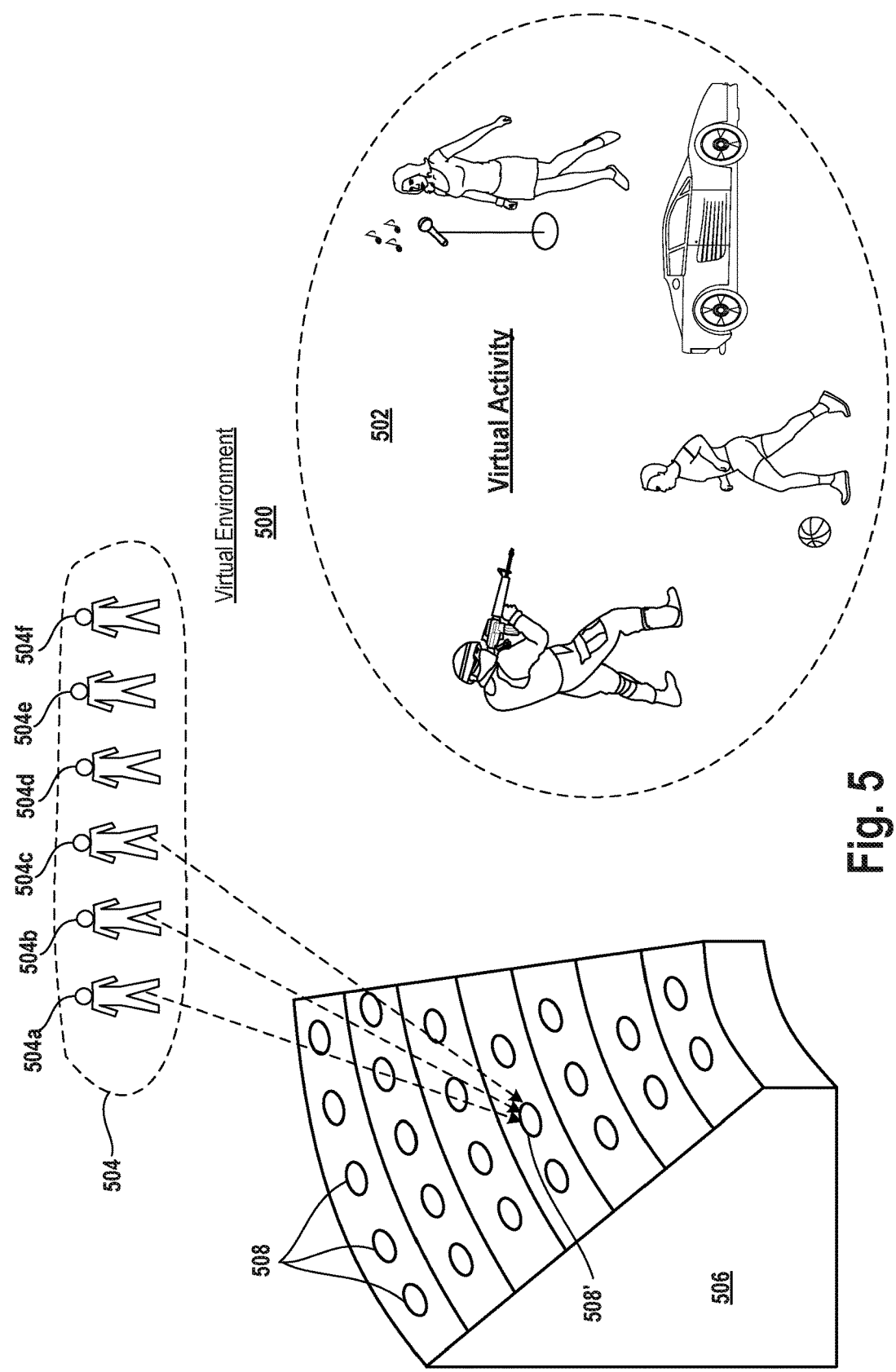
FIG. 5 illustrates a virtual environment with locations for spectators, in accordance with implementations of the disclosure.

FIG. 5 illustrates a virtual environment with locations for spectators, in accordance with implementations of the disclosure. In the illustrated implementation, a VR environment 500 is shown, in which some activity 502 or event of interest takes place which users may wish to spectate. For example, the VR environment 500 may be a three-dimensional (3D) gaming environment in which gameplay of a video game occurs. It will be appreciated that the activity taking place in the VR environment can be any type of virtual activity, including, without limitation, combat (e.g. a first-person shooter game), real-time strategy, racing, sports, dance, theater, musical performance, game show, etc.

To accommodate a number of spectators in the VR environment, there can be a designated viewing area, where a plurality of spectator avatars can be positioned. Strictly speaking, a spectator is a user (human) that spectates the VR environment (e.g. using an HMD). However, the spectator can be represented in the VR environment by an avatar (also referred to as the spectator's avatar), which may be controlled by the spectator. As the spectator's avatar in the VR environment is representative of the spectator and controlled by the spectator, for ease of description in the present disclosure, the spectator and his/her avatar may in some instances be used interchangeably. It will be apparent to those skilled in the art that the (human) spectator is distinct from the spectator's avatar, but the two may nonetheless be referenced in a synonymous manner to simplify the description of the present implementations.

In the illustrated implementation, the designated viewing area is conceptualized as a stadium seating structure 506. However, it will be appreciated that in various implementations of the disclosure the designated viewing area can take any form having a plurality of predefined locations at which spectator avatars can be positioned. Merely by way of example, without limitation, the designated viewing area could be one of (or a part of) a hill, field, bleachers, seats, arena, stadium, theater, club, sidewalk, roadside, steps, patio, deck, platform, rooftop, skybox, vehicle (e.g. automobile, train, boat, airplane, helicopter, spacecraft, etc.), or any other type of virtual object which may serve as an area in the VR environment from which spectators may spectate the virtual activity 502.

With continued reference to FIG. 5, the stadium seating structure 506 includes a plurality of locations 508 (which may be seats in the stadium seating structure) which are predefined for placement of spectator avatars. The spectators 504 are conceptually shown including spectators 504a-f, etc. As the virtual environment 500 is not subject to real-world physical constraints, it is possible to provide each of the spectators 504 with the "best seat in the house." That is, each spectator can spectate from the same preferred location, which in the present instance is the location 508'. It will be appreciated that the "best" location for spectating, from among a plurality of possible locations, is predefined and may be determined based on various factors, such as proximity to the activity of interest, height, scope of the view, obstruction of the view (or lack thereof), centeredness relative to the activity of interest, etc.

As noted, each spectator 504a-f, etc. spectates from the same location/seat 508', which is the preferred location in the illustrated implementation. Thus, every spectator will experience the same, or substantially the same, viewing perspective in the VR environment 500. However, to achieve a sense of being in a crowd, when providing the view to a given spectator from the location 508', then the remaining spectators can be positioned at other locations 508 around the given spectator in the structure 506. For example, for purposes of providing a spectator view of the VR environment to spectator 504a, then spectator 504a's avatar (and viewpoint) is positioned at location 508', and the other spectators 504b-f, etc. are positioned at the other locations 508 in the structure 506. Whereas when providing the spectator view for spectator 504b, then spectator 504b is positioned at location 508', and the other spectators 504a, 504c-f, etc. are positioned at the other locations 508 in the structure 506. Thus, the spectator 504a may look around from the standpoint of location 508' and see the other spectator avatars surrounding him/her. Likewise, the spectator 504b may also look around from the standpoint of location 508' and see the other spectator avatars surrounding him/her. Thus, all the spectators can be provided with the "best" viewing position, yet also experience the sensation of being in a crowd of spectators. As will be discussed further below, the orientations of the spectators can be adjusted depending on the spectator for whom the view is being provided.

Figure 6:
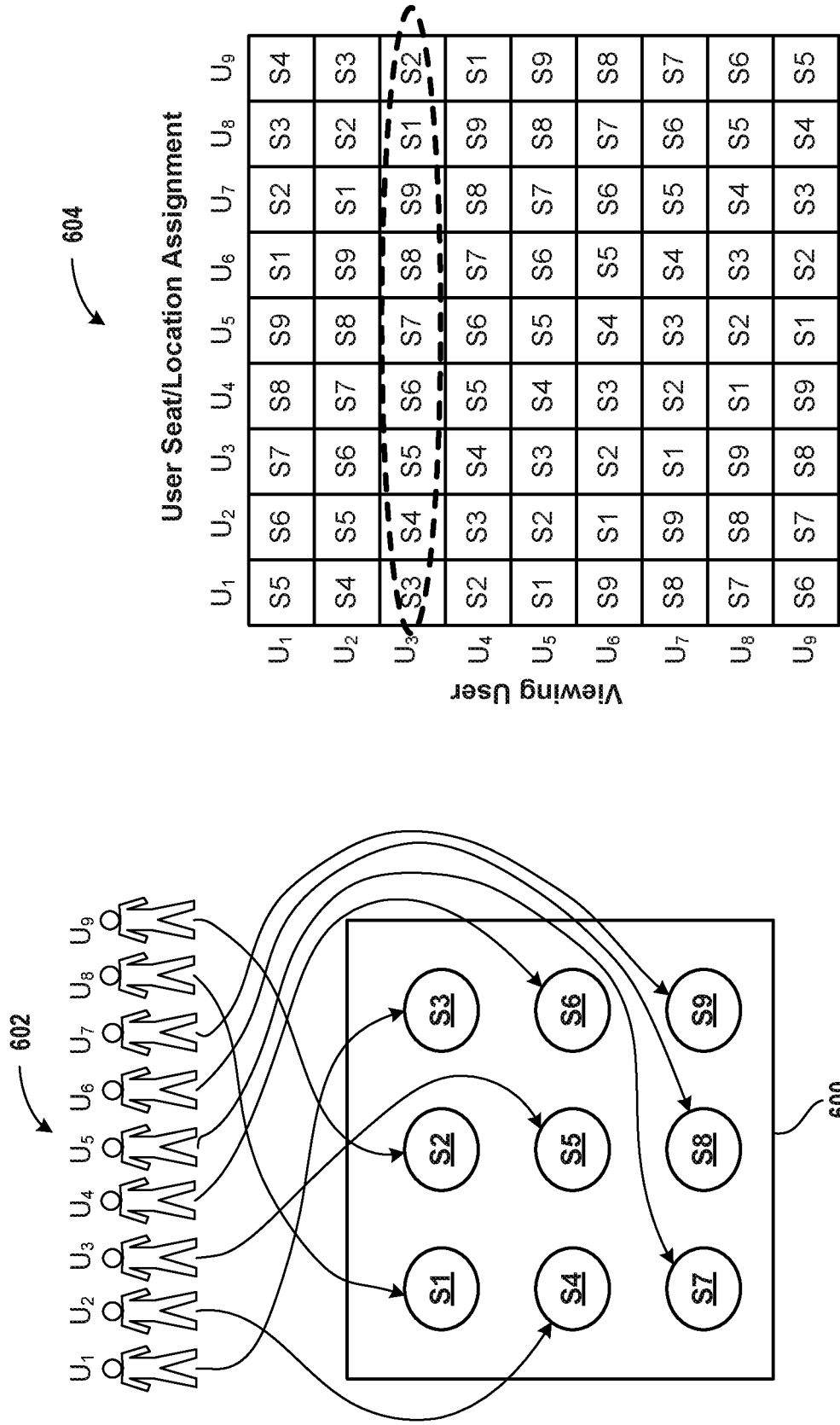
FIG. 6 illustrates placement of spectators in a viewing area/region of a VR environment, in accordance with implementations of the disclosure.

FIG. 6 illustrates placement of spectators in a viewing area/region of a VR environment, in accordance with implementations of the disclosure. In the illustrated implementation, a viewing region/area 600 is provided having nine locations/seats S1-S9. A plurality of spectators $U_1$ to $U_9$ (conceptually shown at ref. 602) are positioned in the locations S1-S9, depending upon which spectator is being provided with the view of the VR environment in which the viewing region 600 is disposed. In the viewing region 600, the location S5 is the best location/seat for spectating, and therefore each user will spectate from the location S5. For a given spectator that is placed at the location S5 when spectating, then the remaining spectators are placed in the other remaining locations/seats around him/her in the viewing region 600.

One way of managing the placement of spectators in the locations of the viewing region 600 is to define an order of the locations of the viewing region, and an order of the spectators, and shift the order of spectators relative to the order of the locations. Such a setup is illustrated by the seating matrix 604, in which each row indicates for a given viewing user (spectator for whom the view of the VR environment is being provided) the assignment of spectators to locations in the viewing region 600. Thus, in each row, the viewing user is assigned to location S5, as S5 is the best or preferred seat/location. In other words, each spectator will spectate the VR environment from the same location S5.

By way of example, in the illustrated implementation, the arrangement of spectators that is provided when spectator $U_3$ is viewing the VR environment is shown. Spectator $U_3$ is positioned at location S5, while spectators $U_4$ to $U_7$ are positioned at locations S6 to S9, respectively. Spectators $U_8$ and $U_9$ are positioned at locations S1 and S2, respectively, and spectators $U_1$ and $U_2$ are positioned at locations S3 and S4, respectively. Thus, when spectator $U_3$ spectates the VR environment, he/she will be able to see the corresponding avatars of the other spectators positioned as thus indicated. When another spectator spectates the VR environment, he/she will see the other spectators positioned in a different manner in the viewing region 600.

Figure 7A:
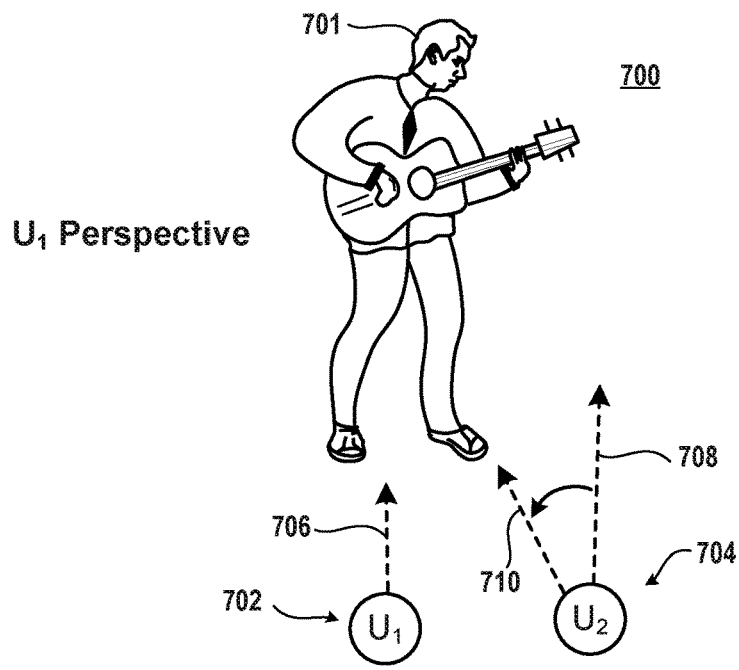
FIGS. 7A and 7B illustrate adjustment of spectator avatars in a VR environment based on their controlling spectator's perceived object of interest, in accordance with implementations of the disclosure.
Figure 7B:
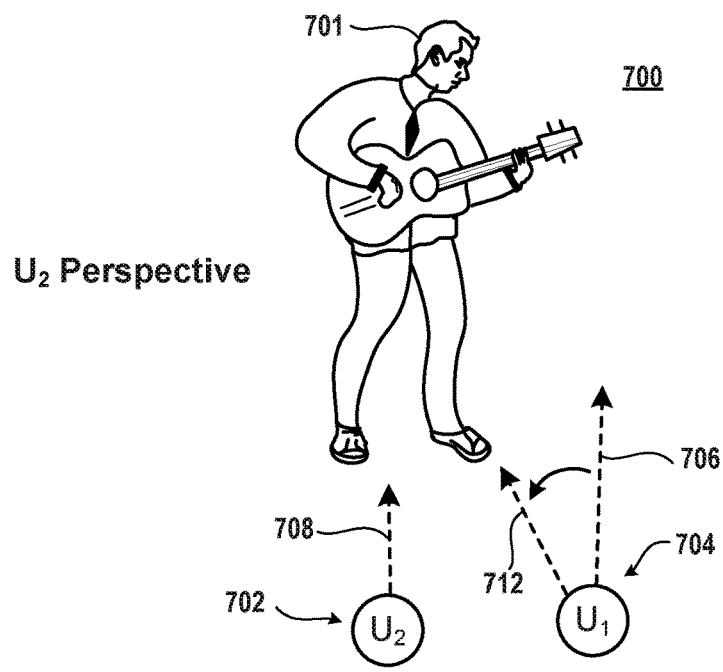

FIGS. 7A and 7B illustrate adjustment of spectator avatars in a VR environment based on their controlling spectator's perceived object of interest, in accordance with implementations of the disclosure. As has been discussed above, when multiple spectators are viewing the VR environment, each one can be provided a view from a preferred location, while avatars of other spectators are positioned at other locations in the VR environment. Thus, the locations of the spectator avatars in the VR environment is dependent upon which spectator for whom the view is being provided. Each spectator will see the VR environment from the same location, but will experience other spectators at other locations surrounding him/her.

However, if for a given spectator's view, the other spectators are simply relocated, they may not appear to be looking at the correct object in the VR environment which they are really looking towards. For example, FIG. 7A illustrates a VR environment 700 as seen from the perspective of a user $U_1$. In the illustrated implementation, the VR environment as experienced by the user $U_1$ is configured such that the user $U_1$ is positioned at a preferred location 702 in front of an object or scene of interest. By way of example only without limitation, in the illustrated implementation, the object of interest is a performer 701. The user $U_1$ is looking towards the performer 701 and thus exhibits a view direction indicated by the dashed arrow 706.

FIG. 7B illustrates the VR environment 700 as seen from the perspective of a user $U_2$. In the illustrated implementation, the VR environment as experienced by the user $U_2$ is configured such that the user $U_2$ is positioned at the preferred location 702 in front of the object/scene of interest, which is performer 701 as noted. Additionally, in user $U_2$'s view of the VR environment, the user $U_1$ has been repositioned at the location 704. By repositioning user $U_1$'s avatar without adjusting the view direction 706 that user $U_1$ exhibited in his view as described above, then the view direction of user $U_1$'s avatar will not appear, in user $U_2$'s view, to be looking towards the performer 701. Therefore, it is useful to adjust the view direction of the user $U_1$ avatar in user $U_2$'s view of the VR environment, to view direction 712, so that user $U_1$'s avatar is looking towards the performer 701. It will be appreciated that adjusting the view direction of the avatar may entail adjustment, such as turning or other pose adjustment, of the avatar's head, eyes, torso, legs, entire body, etc.

Likewise, with reference to FIG. 7A again, in a similar manner as described above, when providing the view of the VR environment to user $U_1$, the view direction of the user $U2$'s avatar can be adjusted from view direction 708 to view direction 710, so as to be towards the performer 701 that is the object of interest.

In order to provide proper adjustment of the avatars of other spectators in the VR environment, the system can be configured to determine what object in the VR environment that a given spectator is looking towards. This can be determined based on extrapolating the view direction of the given spectator to an object in the virtual environment, and will be based on the real-world pose of the HMD that the spectator is wearing, as well as the spectator's location in the VR environment. Thus, when a spectator is viewing the VR environment, logic can be configured to determine the spectator's view direction, and based on the spectator's view direction determine an object of interest towards which the view direction is pointing or directed. Then when the spectator's avatar is rendered in another spectator's view of the VR environment, it can be adjusted so as to have a view direction that is towards the object of interest.

FIGS. 8A, 8B, and 8C illustrate a VR scene in a VR environment as viewed from the perspectives of three different spectators, in accordance with implementations of the disclosure. With reference to FIG. 8A, the VR scene is shown as viewed from the perspective of user/spectator $U_1$, who is positioned at a predefined spectator location 802. In the VR scene are a character 806 and a monster 808. Also, avatars of other users/spectators U2 and U3 are shown, positioned at predefined spectator locations 804 and 800, respectively. The spectator U1 has a view direction 810 that is directed towards the spectator $U_2$'s avatar. The spectator $U_2$'s avatar has a view direction 812 towards the monster 808. And the spectator $U_3$'s avatar has a view direction 814 towards the character 806. It will be appreciated that in some implementations, the spectators are wearing HMDs, and the view directions of the spectators in the VR environment have been determined based on detected real-world poses of the HMDs.

FIG. 8B illustrates the VR scene as viewed from the perspective of spectator $U_2$. As shown, the spectator $U_2$ occupies location 802, while spectators $U_1$ and $U_3$ occupy locations 800 and 804, respectively. The spectator $U_2$ has a view direction 818 that is towards the monster 808; the spectator $U_1$ avatar has a view direction 816 towards spectator $U_2$'s location; the spectator $U_3$ avatar has a view direction 820 towards the character 806.

FIG. 8C illustrates the VR scene as viewed from the perspective of spectator $U_3$. As shown, the spectator $U_3$ occupies location 802, while spectators $U_2$ and $U_3$ occupy locations 800 and 804, respectively. The spectator $U_3$ has a view direction 824 that is towards the character 806; the spectator $U_1$ avatar has a view direction 826 towards spectator $U_2$'s location; the spectator $U_2$ avatar has a view direction 822 towards the monster 808.

As can be seen from the above, by adjusting the view directions of other spectators' avatars when presenting the VR scene to a particular spectator, then the rendering of the other spectators' avatars can be faithful in indicating what objects in the VR environment are currently being viewed by the other spectators.

Though the concepts described herein are described with reference to specific numbers of spectators, it should be appreciated that they may be applied to any number of spectators. Additionally, in some implementations, some spectators can be positioned in proximity to each other based on various factors, such as membership in a social graph (connection or being "friends" on a social network), geographic location, common language, age, gender, interests, gaming history, etc.

Figure 9:
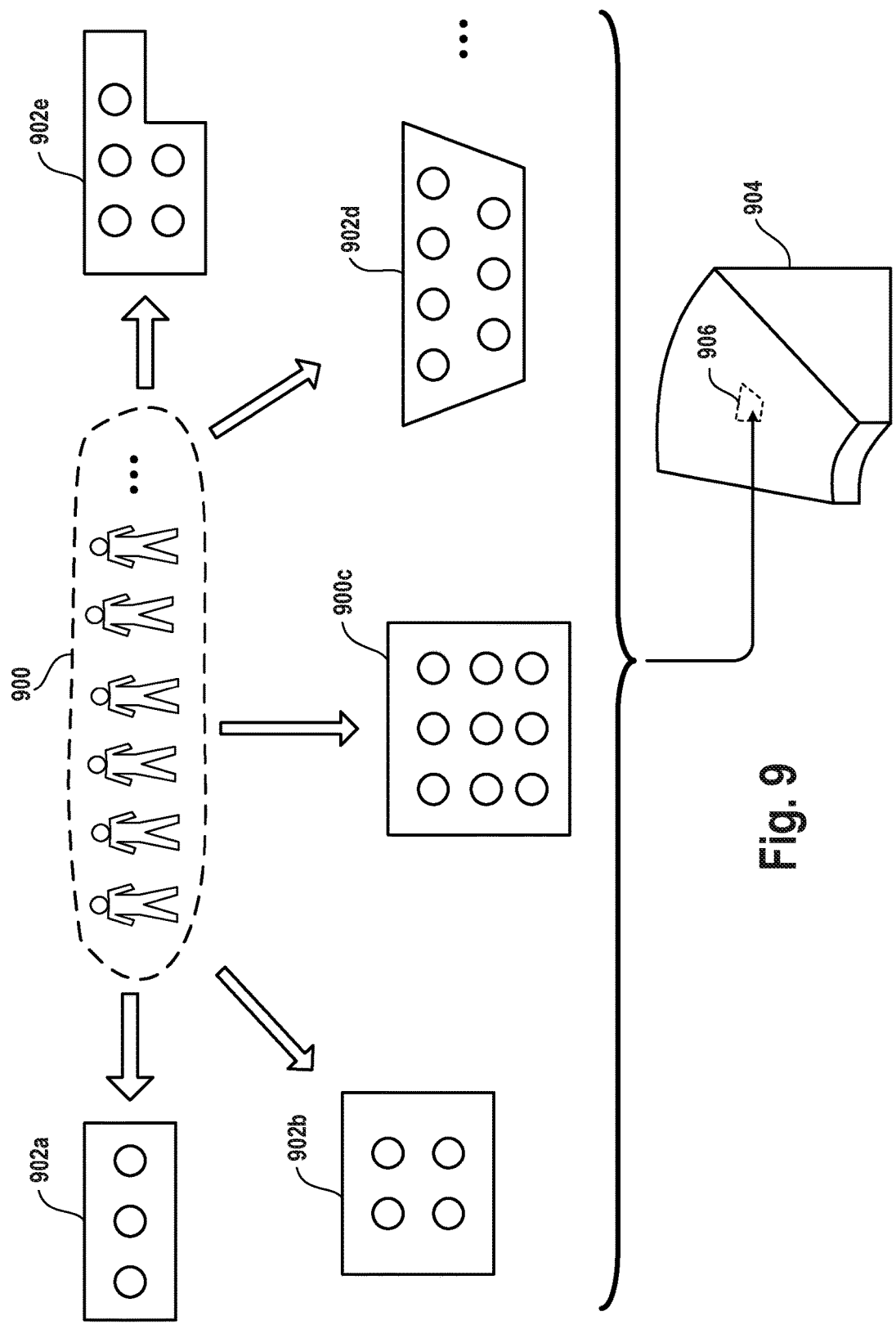
FIG. 9 conceptually illustrates a plurality of spectators organized into various viewing groups, in accordance with implementations of the disclosure.

FIG. 9 conceptually illustrates a plurality of spectators organized into various viewing groups, in accordance with implementations of the disclosure. In the illustrated implementation, a plurality of spectators can be organized into various viewing groups, such as viewing groups 902*a-e*. It will be appreciated that in some implementations, the number of spectators to be included in a given viewing group can vary. For example, viewing group 902*a* is defined to include three spectators; viewing group 902*b* is defined to include four spectators; viewing group 902*c* is configured to include nine spectators; etc. Whereas, in other implementations, a single group size is specified. For purposes of viewing the VR environment, when providing a view of the VR environment for a given spectator, the viewing group to which that spectator is assigned is positioned in the VR environment at a preferred viewing location, such as location 906 in the viewing region structure 904.

A given viewing group defines a spatial arrangement of the spectators that are in the viewing group. That is, when rendered in the VR environment, the spectator avatars of the viewing group will have a particular spatial arrangement that is fixed, in the sense that (unlike some previously described implementations) the spectators' locations relative to each other do not change depending on which spectator's view is being provided. By way of example, viewing group 902C as shown defines an arrangement of nine spectator positions within the group as shown; and each spectator of the group would be assigned to one of the nine positions. Thus, spectators of a given viewing group do not spectate from the exact same location in the VR environment, but rather from different locations that are proximate to each other. And within the particular viewing group, the location of one of the spectators is consistent when rendering views of the VR environment for each of the spectators of the group.

However, it will be appreciated that each of the various groups can be positioned at the same, or substantially the same (e.g. if group sizes vary), location in the VR environment (so as to provide every spectator with a view from a preferred viewing location). Thus, spectators from different groups may indeed be positioned at the same location in the VR environment. However, such spectators from different groups would not simultaneously be rendered at the same location when providing a view of the VR environment. For when providing a view of the VR environment to a given spectator, then only the members of the given spectator's viewing group would occupy their particular locations in the VR environment (as defined by the viewing group's arrangement of spectators).

As the spatial location of spectators within a viewing group is fixed (i.e. does not change depending on which spectator of the group is being provided with a view of the VR environment), then the view directions of the spectators in the viewing group do not need to be adjusted when rendering views of the VR environment for the group's spectators. Furthermore, potentially unnatural or odd adjustments in view direction are avoided, and more natural interaction between spectators via their VR avatars is obtained.

When providing a view for a given spectator, beyond the spectator's viewing group, other viewing groups or other spectator avatars can be rendered at other proximate locations that are not occupied my members of the spectator's viewing group. The view directions of such other spectator avatars may be adjusted based on objects of interest towards which their corresponding spectators are looking.

It will be appreciated that spectators 900 can be organized into viewing groups based on relationships in a social graph. For example, it can be useful to group a given spectator with his/her friends on a social network, or based on any other factor, such as the factors enumerated above regarding positioning of spectators in proximity to each other.

In some implementations, spectators of a given viewing group are permitted to interact with one another. Whereas such spectators are not permitted to interact with other spectators that are not in the given viewing group.

Figure 10A:
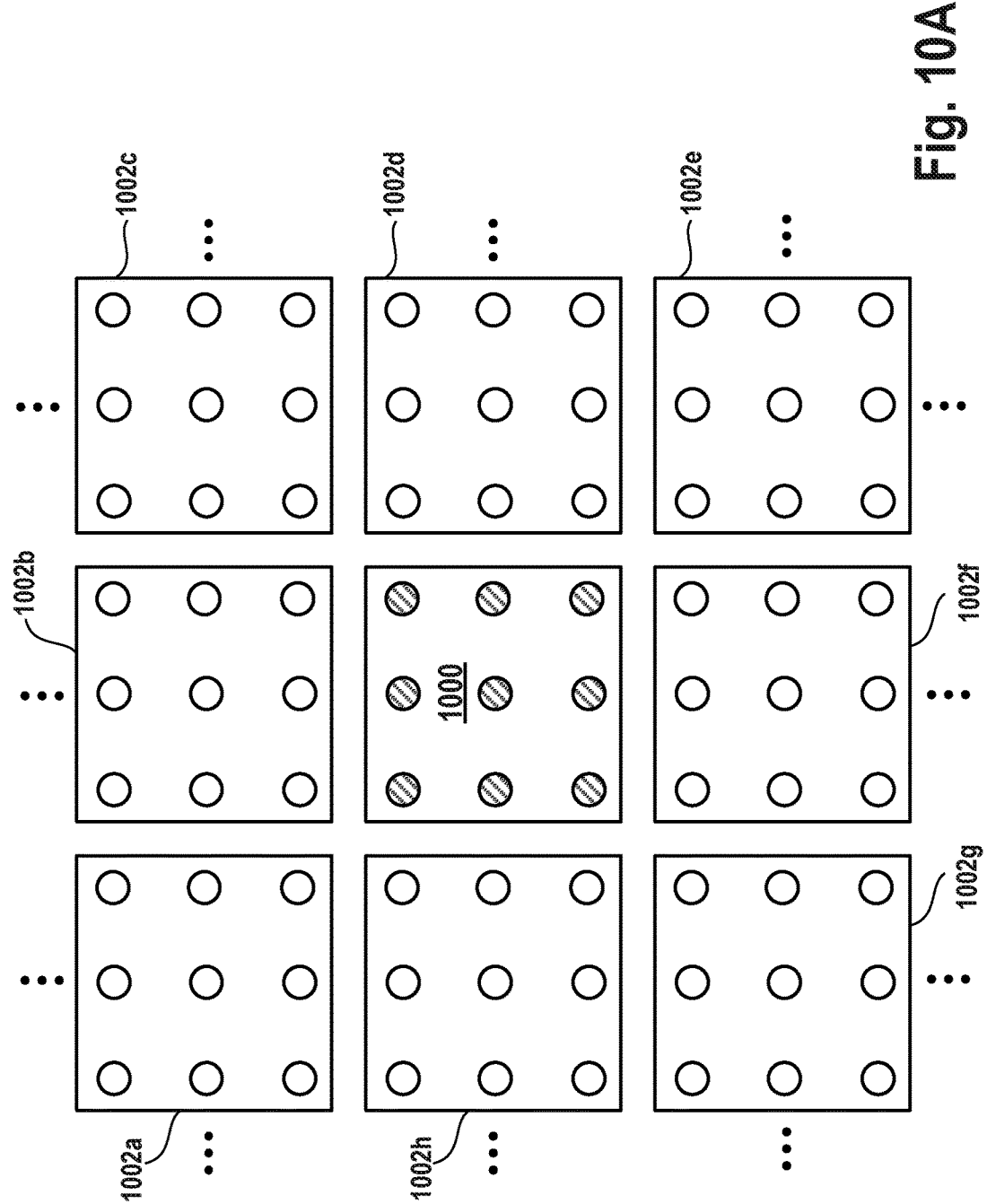
FIG. 10A illustrates a viewing group 1000 in a VR environment surrounded by additional viewing groups 1002a-h, in accordance with implementations of the disclosure.

FIG. 10A illustrates a viewing group 1000 in a VR environment surrounded by additional viewing groups 1002a-h, in accordance with implementations of the disclosure. The viewing group 1000 is positioned at a preferred viewing location in the VR environment. In some implementations, the additional viewing groups are selected dynamically from a pool of viewing groups. However, in other implementations, the viewing groups are logically arranged in a layout, and the layout of viewing groups is conceptually "shifted" so as to present a specific viewing group at the preferred viewing location in the VR environment (when presenting a view for a spectator in the specific viewing group). The viewing region in the VR environment may accommodate a limited number of spectators or viewing groups, and so a portion of the layout of viewing groups can be fitted so that the specific viewing group is positioned at the preferred viewing location in the VR environment. In some implementations, the layout can be logically configured in a continuous manner, so that every viewing group is bordered on all sides by another viewing group.

FIG. 10B illustrates a viewing group 1000 in a VR environment surrounded by additional viewing groups of various sizes, in accordance with implementations of the disclosure. As with the configuration of FIG. 10A, the additional viewing groups can be dynamically selected and positioned in some implementations. Whereas in another implementation, a layout of the viewing groups is determined, and a portion thereof is fitted to the viewing region of the VR environment so as to position a particular viewing group at the preferred position (e.g. when rendering a view for one of the spectators in the particular viewing group).

Figure 11:
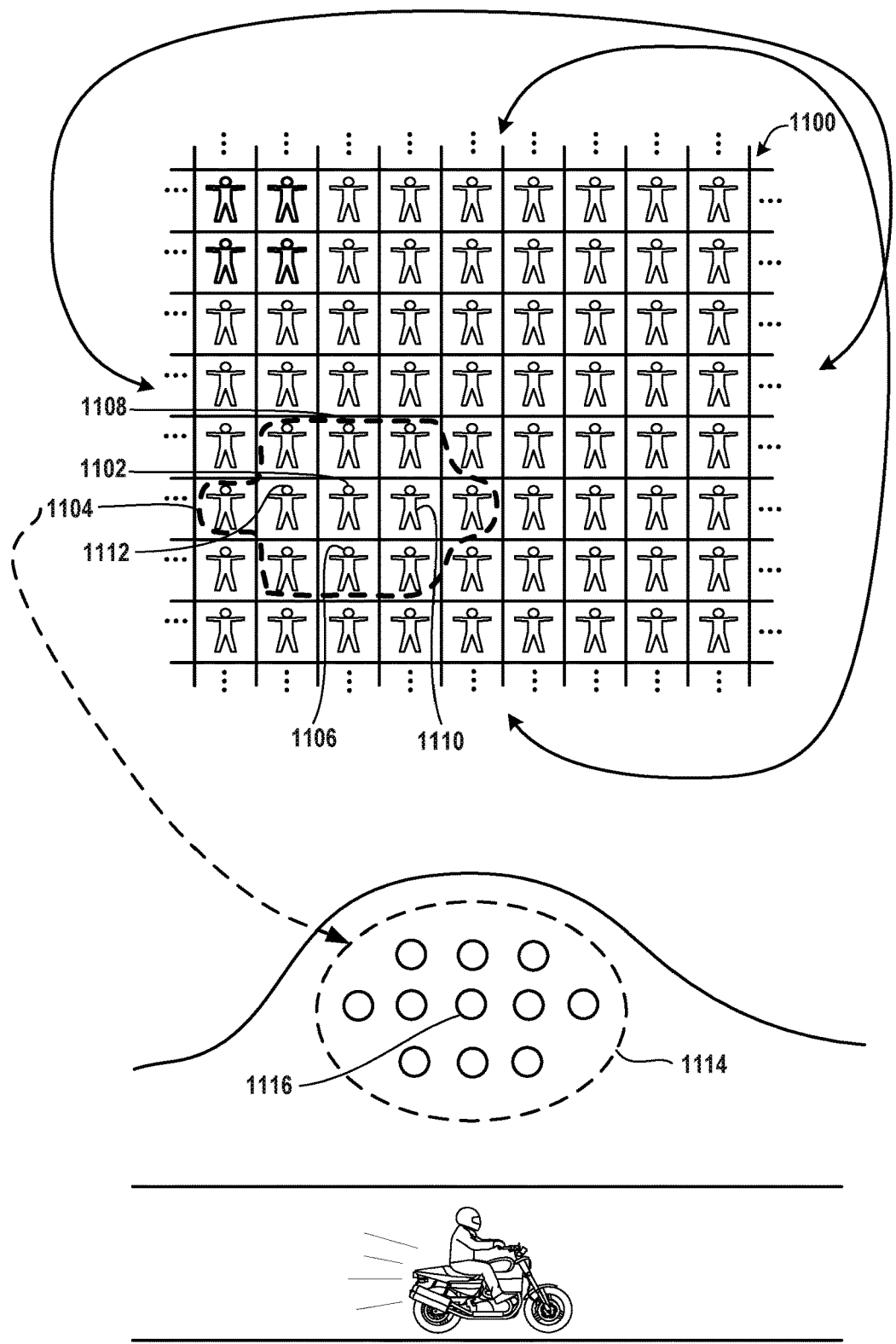
FIG. 11 illustrates an array 1100 of spectators, in accordance with implementations of the disclosure.

FIG. 11 illustrates an array 1100 of spectators, in accordance with implementations of the disclosure. The array 1100 defines a spatial arrangement of the spectators, defining the relative positioning of the spectators when they are rendered (more specifically, when their avatars are rendered) in the VR environment. In accordance with implementations of the disclosure, each of the spectators can spectate from the same preferred location within the VR environment, while also experiencing a sense of being in a crowd. To accomplish this, when providing the view of the VR environment for a particular spectator 1102, by way of example, then a portion 1104 of the array 1100 that includes spectator 1102 is selected so that when the spectators included in the portion 1104 are fitted to a viewing region in the VR environment, maintaining their spatial relationship to each other as defined by the array, then the spectator 1102 will be positioned at the preferred location.

For example, in the illustrated implementation, the viewing region 1114 in the VR environment may have viewing locations to accommodate three rows of spectators, with three spectators in a top row, five in a middle row, and three in a bottom row, with a preferred viewing location being the centermost viewing location 1116. Thus, portion 1104 is selected so as to provide for corresponding three spectators in the row above that of spectator 1102, five spectators from spectator 1102's row (including two each from the left and right of spectator 1102), and three spectators from the row below that of spectator 1102. Thus, when the spectators from portion 1104 are respectively positioned in the corresponding viewing locations of the viewing region 1114, then the spectator 1102 will be positioned in the preferred viewing location, with the other spectators surrounding him in accordance with their spatial relationship defined by the array 1100. As shown in the array 1100, for example, spectators 1106, 1108, 1110, and 1112 are positioned immediately below, above, to the left, and to the right, respectively, of spectator 1102. Accordingly, when the spectator 1102 is viewing the VR environment, he will experience spectators 1106, 1108, 1110, and 1112 positioned immediately below, above, to his left, and to his right, respectively.

It will be appreciated that this spatial relationship amongst spectators of the array 1100 is maintained regardless of which spectator is viewing the VR environment. So for example, in a view of the VR environment provided to spectator 1108, then a different portion of the array would be selected (in order to position spectator 1108 in the preferred viewing location 1116), yet the spatial relationship with other spectators would be maintained as it is according to that defined by the array. Thus, in the view provided to spectator 1108, spectator 1102 would be immediately below spectator 1108, spectator 1110 would be below and to the left of spectator 1108, and spectator 1112 would be below and to the right of spectator 1108.

The foregoing configuration can be conceptually described in other ways. For example, the viewing region 1114 defines an arrangement of viewing locations and can be thought of as a selector that can be shifted to different parts of the array 1100 depending on which spectator for whom a view of the VR environment is being provided; the viewing locations of the viewing region 1114 will be populated by the spectators falling within the selector according to their predefined positions in the array. Or the array can be shifted relative to the viewing region 1114 to similar effect.

Additionally, it will be appreciated that the assignment of spectators to specific positions in the array 1100 can be based on various factors, such as relationship in a social network, or other factors as described above.

Though implementations have generally been described with reference to a single viewing region in a VR environment, it will be appreciated that there can be multiple viewing regions in a VR environment. Furthermore, there may be multiple pools of spectators which may be defined based on factors such as geographic location, language, experience level, etc. The concepts described herein can be applied to multiple viewing regions and multiple pools of spectator.

In some implementations, the spectator viewing regions may be configured to move within the VR environment, for example, to enable spectating of moving action in the VR environment, such as when a player character moves through a video game environment. The effect can be similar to viewing from a moving vehicle. The principles described above can be applied to enable spectators to have the preferred viewing location within the moving viewing region.

Figure 12:
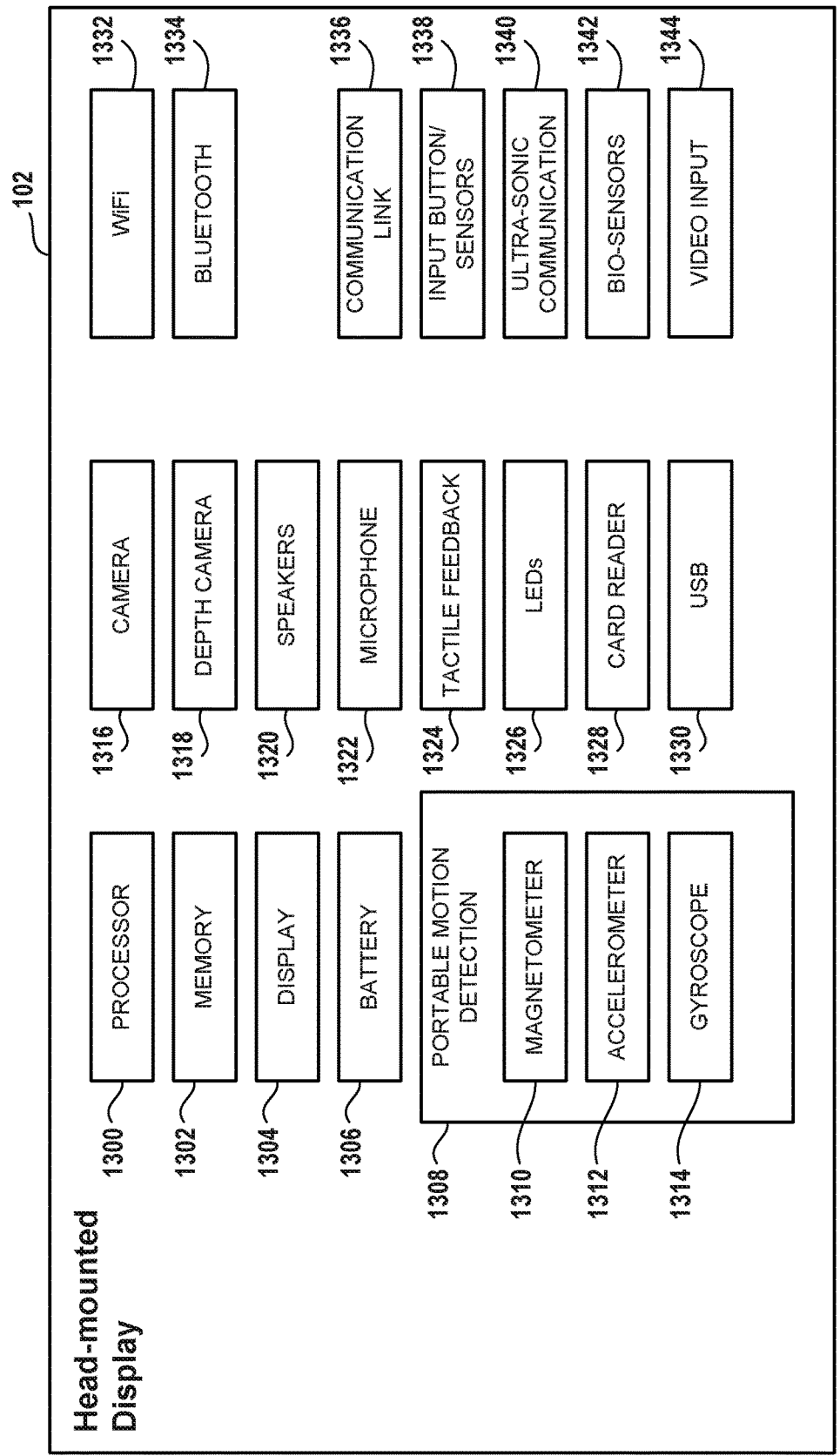
FIG. 12 illustrates components of a head-mounted display, in accordance with an embodiment of the disclosure.

With reference to FIG. 12, a diagram illustrating components of a head-mounted display 102 is shown, in accordance with an embodiment of the disclosure. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 13:
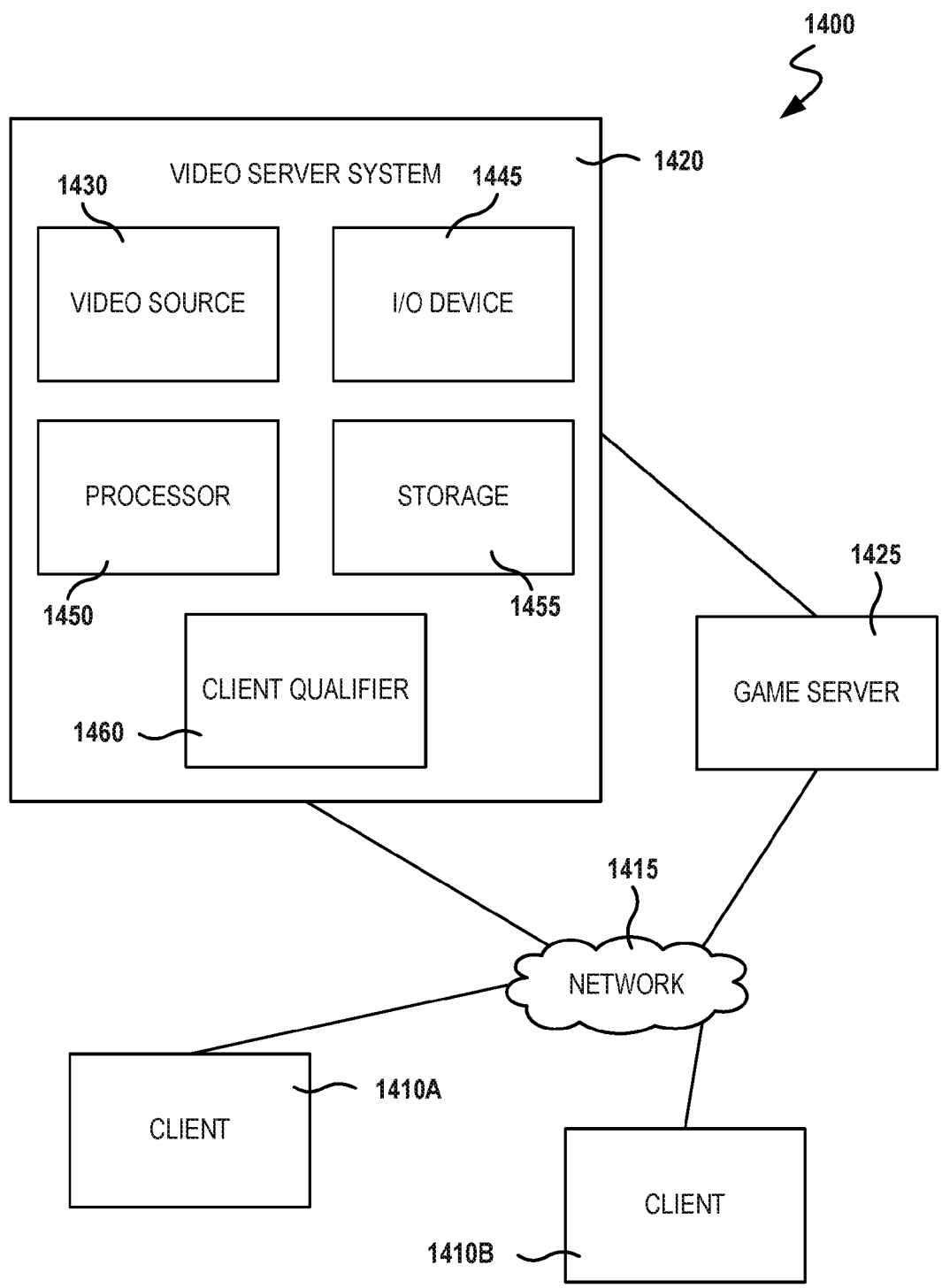
FIG. 13 is a block diagram of a Game System 1400, according to various embodiments of the disclosure.

FIG. 13 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a Client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method, comprising:
   providing a first view of a virtual environment to a first head-mounted display (HMD), the first view being associated to a first virtual character having a first view direction towards a virtual object in the virtual environment, the first view being from a first-person perspective of the first virtual character as the first virtual character is positioned at the first location, the first view direction defined from the first-person perspective of the first virtual character;

simultaneous with the providing the first view, providing a second view of the virtual environment to a second HMD, the second view being associated to a second virtual character in the virtual environment, the second view being from a first-person perspective of the second virtual character as the second virtual character is positioned at the first location;

wherein providing the second view includes rendering the first virtual character in the second view, the rendering of the first virtual character in the second view being configured to present the first virtual character as having being positioned at a second location in the virtual environment, the rendering of the first virtual character in the second view being further configured to present the first virtual character as having a second view direction that is adjusted relative to the first view direction so as to be from a first-person perspective of the first virtual character as the first virtual character is positioned at the second location, and so as to be towards the virtual object as shown in the second view.

2. A method, comprising:

providing a first view of a virtual environment to a first head-mounted display (HMD), the first view being defined from a first location in the virtual environment, and associated to a first virtual character having a first view direction towards a virtual object in the virtual environment;

simultaneous with the providing the first view, providing a second view of the virtual environment to a second HMD, the second view being defined from the first location in the virtual environment, and associated to a second virtual character in the virtual environment;

wherein providing the second view includes rendering the first virtual character in the second view, the rendering of the first virtual character in the second view being configured to present the first virtual character as having a second location in the virtual environment, the rendering of the first virtual character in the second view being further configured to present the first virtual character as having a second view direction that is adjusted relative to the first view direction so as to be towards the virtual object as shown in the second view;

wherein the second view direction is adjusted relative to the first view direction by turning a head and/or body of the first virtual character so as to face towards the virtual object.

3. The method of claim 1, wherein providing the first view of the virtual environment to the first HMD includes processing data identifying an orientation of the first HMD in a first interactive environment in which the first HMD is disposed;

wherein the first view direction is substantially determined by the orientation of the first HMD in the first interactive environment.

4. The method of claim 3, wherein providing the second view of the virtual environment to the second HMD includes processing data identifying an orientation of the second HMD in a second interactive environment in which the second HMD is disposed.

5. The method of claim 1, wherein the virtual object towards which the first view direction is directed is identified based on extrapolation of the first view direction from the first location in the virtual environment.

6. The method of claim 1, wherein the second view direction is determined based on relative positioning of the first location, the second location, and the virtual object in the virtual environment.

7. The method of claim 1, wherein the virtual environment is defined for gameplay of a video game, and wherein the first view and second view are spectator views of the gameplay of the video game.

8. A method, comprising:

receiving, over a network, requests to spectate a virtual environment using a plurality of head-mounted displays (HMDs);

assigning each HMD to one of a plurality of viewing groups, each viewing group defining a spatial arrangement in the virtual environment for avatars associated with HMDs that are assigned to the viewing group;

for each HMD, providing, over the network, a view of the virtual environment for rendering on the HMD, wherein providing the view includes placing the viewing group to which the HMD is assigned at a designated view location in the virtual environment, and providing the view from a first-person perspective of the HMD's associated avatar as defined by the spatial arrangement of the viewing group as the viewing group is placed at the designated view location;

wherein the designated view location in the virtual environment is the same for each viewing group.

9. The method of claim 8, wherein the spatial arrangement defined by a given viewing group includes a cluster of avatar placement locations having a fixed spatial relationship to each other in the virtual environment.

10. The method of claim 8, wherein when providing the view for a given HMD, the viewing group to which the given HMD is assigned is placed in the designated view location to the exclusion of other viewing groups.

11. The method of claim 10, wherein when providing the view for the given HMD, at least some of the other viewing groups are placed at other view locations in the virtual environment so as to be adjacent to and/or surrounding the viewing group to which the given HMD is assigned.

12. The method of claim 8, wherein assigning the HMDs is based on social graphs of user accounts associated with the HMDs.

13. The method of claim 8, wherein the requests to spectate the virtual environment are received over the network from a plurality of HMD connected computers.

14. A method, comprising:

receiving, over a network, requests to spectate a virtual environment using a plurality of head-mounted displays (HMDs);

for each HMD, assigning an avatar associated with the HMD to a position in a spectator array, the spectator array defining an arrangement of the avatars relative to each other in the virtual environment when rendered in the virtual environment;

for each HMD, providing, over the network, a view of the virtual environment for rendering on the HMD, wherein providing the view includes positioning a portion of the spectator array that includes the HMD's associated avatar in the virtual environment, so that the HMD's associated avatar is positioned at a primary viewing location in the virtual environment, the view being from a first-person perspective of the HMD's associated avatar as the HMD's associated avatar is positioned at the primary viewing location;

wherein the primary viewing location in the virtual environment is the same for each HMD.

15. The method of claim 14, wherein positioning the portion of the spectator array that includes the HMD's associated avatar, so that the HMD's associated avatar is located at the primary viewing location, further includes, positioning other avatars, that are included in the portion of the spectator array, at secondary viewing locations surrounding the primary viewing location in the virtual environment, the positioning of the other avatars at the secondary viewing locations being configured to maintain the arrangement of the HMD's associated avatar and the other avatars relative to each other as defined by the spectator array.

16. The method of claim 15, wherein the arrangement of the avatars relative to each other identifies a fixed spatial positioning of the avatars relative to each other.

17. The method of claim 14, wherein when providing the view for a given HMD, the HMD's associated avatar is positioned at the primary viewing location to the exclusion of other avatars.

18. The method of claim 14, wherein assigning the HMDs is based on social graphs of user accounts associated with the HMDs.

19. The method of claim 14, wherein the requests to spectate the virtual environment are received over the network from a plurality of HMD connected computers.

\* \* \* \* \*